United States Patent
Wu

(10) Patent No.: US 8,526,937 B2
(45) Date of Patent: Sep. 3, 2013

(54) METHOD OF HANDLING LOGGED MDT REPORTING IN A WIRELESS COMMUNICATION SYSTEM AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 49 days.

(21) Appl. No.: 13/221,826

(22) Filed: Aug. 30, 2011

(65) Prior Publication Data

US 2012/0052856 A1    Mar. 1, 2012

Related U.S. Application Data

(60) Provisional application No. 61/377,994, filed on Aug. 30, 2010, provisional application No. 61/378,400, filed on Aug. 31, 2010.

(51) Int. Cl.
*H04W 24/10* (2009.01)

(52) U.S. Cl.
USPC ............... 455/422.1; 370/252; 455/423

(58) Field of Classification Search
USPC ............ 455/423, 450, 550.1, 422.1; 370/252
See application file for complete search history.

(56) References Cited

U.S. PATENT DOCUMENTS

| 2010/0190488 A1 | 7/2010 | Jung | |
|---|---|---|---|
| 2012/0113837 A1 * | 5/2012 | Siomina et al. | 370/252 |
| 2012/0309404 A1 * | 12/2012 | Suzuki et al. | 455/450 |

OTHER PUBLICATIONS

3GPP TS 37.320 V0.5.0 (May 2010) Technical Specification 3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10).
3GPP TS 36.331 V9.3.0 (Jun. 2010) Technical Specification 3rd Generation Partnership Project; Technical Specification Group Radio Access Network; Evolved Universal Terrestrial Radio Access (E-UTRA); Radio Resource Control (RRC); Protocol specification (Release 9).
3GPP TS 25.331 V9.3.0 (Jun. 2010) Technical Specification 3rd Generation Partnership Project; Technical Specification Group Radio Access Network; Radio Resource Control (RRC); Protocol specification (Release 9).
European patent application No. 11007051.3, European Search Report mailing date: Jan. 11, 2012.
Vodafone, "Mechanisms for Delayed Reporting in Connected Mode", 3GPP TSG RAN WG2 #69, R2-101297, Feb. 22-26, 2010, San Francisco, USA, XP050421647, p. 1-5.
Kyocera, "Inter-RAT MDT data retrieval and MDT (re)-configuration", 3GPP TSG-RAN WG2 #71, R2-104813, Aug. 23-27, 2010, Madrid, Spain, XP050451954, p. 1-5.

(Continued)

*Primary Examiner* — Phuoc Doan
(74) *Attorney, Agent, or Firm* — Winston Hsu; Scott Margo

(57) ABSTRACT

A method of handling minimization of drive tests (MDT) reporting of a mobile device in a wireless communication system is disclosed. The method comprises not transmitting a request message to a network of the wireless communication system, when the mobile device is performing the MDT reporting to the network, wherein the request message is used for releasing a connection between the mobile device and the network.

6 Claims, 5 Drawing Sheets

(56) References Cited

OTHER PUBLICATIONS

3GPP TS 37.320 V1.0.0 (Aug. 2010), "3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10)", XP050452266, p. 1-15.

* cited by examiner

METHOD OF HANDLING LOGGED MDT REPORTING IN A WIRELESS COMMUNICATION SYSTEM AND RELATED COMMUNICATION DEVICE

CROSS REFERENCE TO RELATED APPLICATIONS

This application claims both the benefit of U.S. Provisional Application No. 61/377,994, filed on Aug. 30, 2010, entitled "Method and Apparatus for logged MDT reporting in a wireless communication system", and the benefit of U.S. Provisional Application No. 61/378,400, filed on Aug. 31, 2010, entitled "Method and Apparatus for logged MDT reporting in a wireless communication system", the contents of which are incorporated herein in their entirety.

BACKGROUND OF THE INVENTION

1. Field of the Invention

The present invention relates to a method used in a wireless communication system and related communication device, and more particularly, to a method of handling logged minimization of drive tests (MDT) reporting in a wireless communication system and related communication device.

2. Description of the Prior Art

The 3rd Generation Partnership Project (3GPP) has developed a universal mobile telecommunications system (UMTS) which adopts a wideband code division multiple access (WCDMA) as a wireless air interface. In the UMTS, a radio access network known as a universal terrestrial radio access network (UTRAN) includes multiple Node-Bs (NBs) for communicating with multiple user equipments (UEs). The WCDMA provides high frequency spectrum utilization, universal coverage, and high-speed multimedia data transmission which are beneficial for the UEs and the NBs of the UMTS. Furthermore, a long-term evolution (LTE) system is now being developed by the 3GPP as a successor of the UMTS, to further enhance performance of the UMTS to satisfy users' increasing needs. The LTE system includes a new radio interface and radio network architecture that provides a high data rate, low latency, packet optimization, and improved system capacity and coverage. In the LTE system, a radio access network known as an evolved UTRAN (E-UTRAN) includes multiple evolved NBs (eNBs) for communicating with multiple UEs, and communicates with a core network including a mobility management entity (MME), serving gateway, etc for NAS (Non Access Stratum) control.

For a wireless communication system (e.g. the UMTS or the LTE system) to be seamless to a UE such that the UE can be covered everywhere without experiencing call drops or receiving severely faded signals, NBs of the wireless communication system must be deployed properly. However, to deploy the NBs properly, an operator of the wireless communication system must spend many human and material resources in measurements such that optimizations and plannings on deploying the NBs can be performed based on measurement results. The measurements may be performed on strength or quality of signals at certain times and geographical locations which are helpful to deploying the NBs. Therefore, it may be economical to exploit a UE of the wireless communication which is capable of performing the measurements and reporting the measurement results to a NB serving the UE. Accordingly, when more and more UEs can perform the measurements and reporting the measurement results to corresponding NBs, the operator can exploit the measurement results reported by the UEs to perform the optimizations and the plannings on deploying the NBs without spending many human and material resources.

The logged minimization of drive tests (MDT) is proposed to realize the above illustration with the minimized impact on operation and power consumption of the UE. According to the logged MDT, a UE stores measurements performed in an idle mode, and reports the stored measurements (or called MDT logs) to a NB serving the UE when the UE transfers to a connected mode due to a normal event (e.g. a voice call or data call). In other words, the UE will not consume power for transferring to the connected mode to report the MDT logs to the NB, but only report the MDT logs to the NB when the UE is triggered by the normal event to transfer to the connected mode. Therefore, the operator can obtain the MDT logs from the UE via the NB, and the impact to the operation and the power consumption of the UE is minimized at the same time.

However, a size of the MDT logs is usually large, and the UE requires a period of time to finish reporting the MDT logs. Therefore, it is possible that the reporting of the MDT logs is interrupted when the UE is reporting the MDT logs to the NB. For example, the UE may intend to release a connection between the UE and the NB such that the UE can transfer to the idle mode to reduce the power consumption, when the UE finishes receiving services from the NB. To release the connection, the UE can initial a connection release procedure by sending a Signalling Connection Release Indication (SCRI) message to the NB. In this situation, the reporting of the MDT logs is interrupted, and the NB loses MDT logs which have not been received. It is not known whether the NB can continue to receive the MDT logs not received, when the UE transfers back to the connected mode. Therefore, how to handle reporting of the MDT logs when the UE intends to release the connection between the UE and the NB is a topic to be discussed and addressed.

SUMMARY OF THE INVENTION

The present invention therefore provides a method and related communication device for handling logged minimization of drive tests (MDT) reporting in a wireless communication to solve the abovementioned problems.

A method of handling minimization of drive tests (MDT) reporting of a mobile device in a wireless communication system is disclosed. The method comprises not transmitting a request message to a network of the wireless communication system, when the mobile device is performing the MDT reporting to the network, wherein the request message is used for releasing a connection between the mobile device and the network.

A method of handling a plurality of minimization of drive tests (MDT) logs of a network of a wireless communication system is disclosed. The method comprises not responding a request message transmitted by a mobile device in the wireless communication system, when the network is receiving the plurality of MDT logs from the mobile device, wherein the request message is used for releasing a connection between the mobile device and the network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
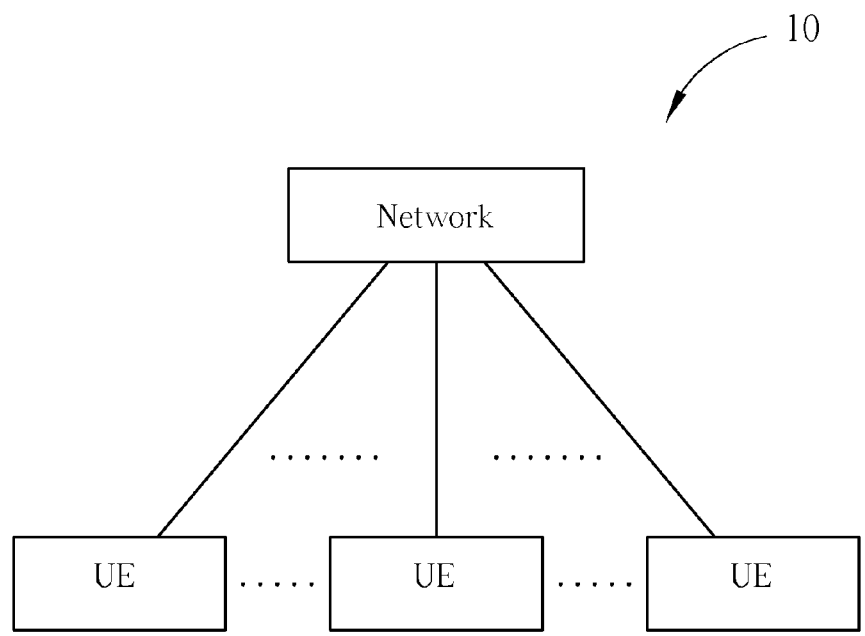
FIG. 1 is a schematic diagram of an exemplary wireless communication system according to the present invention.

Please refer to FIG. 1, which is a schematic diagram of a wireless communication system 10 according to an example of the present invention. The wireless communication system 10, such as a long term evolution (LTE) system or a universal mobile telecommunications system (UMTS), is briefly composed of a network and a plurality of user equipments (UEs). In FIG. 1, the network and the UEs are simply utilized for illustrating the structure of the wireless communication system 10. Practically, the network can be referred as to an evolved universal terrestrial radio access network (E-UTRAN) comprising a plurality of evolved Node-Bs (eNBs) in the LTE system, or a UTRAN comprising a plurality of NBs. The UEs can be mobile devices such as mobile phones, laptops, tablet computers, electronic books, and portable computer systems. Besides, the network and a UE can be seen as a transmitter or a receiver according to transmission direction, e.g., for an uplink (UL), the UE is the transmitter and the network is the receiver, and for a downlink (DL), the network is the transmitter and the UE is the receiver.

Besides, the UE and the network support the logged minimization of drive tests (MDT). In other words, the network can configure the UE to store measurements performed in an idle mode, and to report the stored measurements (or called MDT logs) to the network when the UE transfers to a connected mode due to a normal event. The normal event may be a voice/data call which is generated by the UE or forwarded by the network to the UE.

Figure 2:
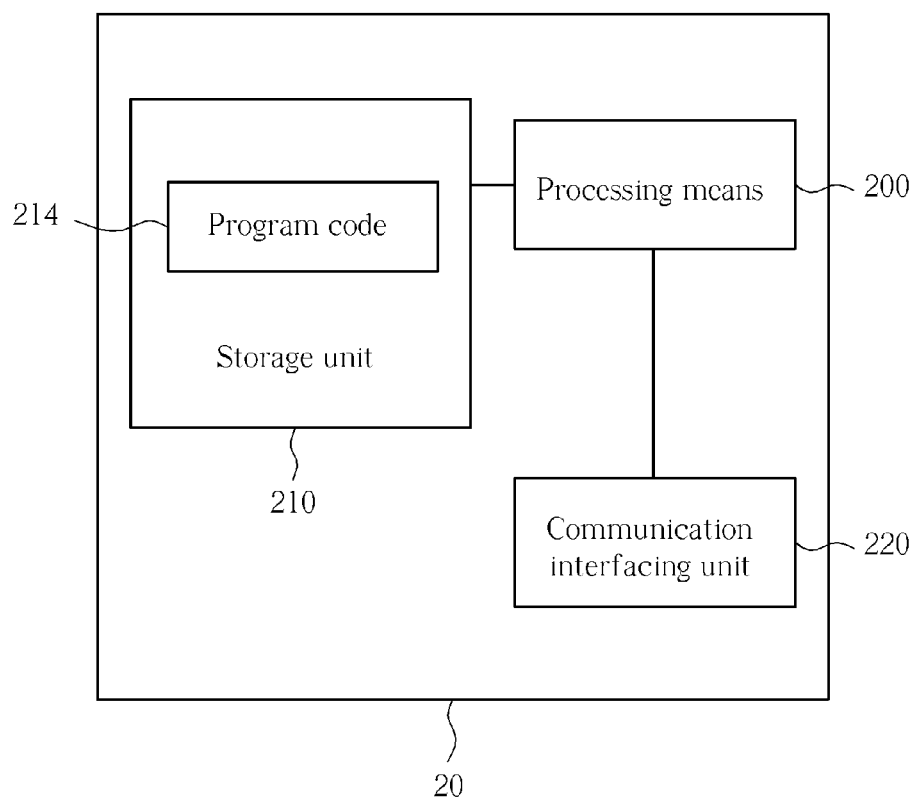
FIG. 2 is a schematic diagram of an exemplary communication device according to the present invention.

Please refer to FIG. 2, which is a schematic diagram of a communication device 20 according to an example of the present invention. The communication device 20 can be the UE or the network shown in FIG. 1, but is not limited herein. The communication device 20 may include a processor 200 such as a microprocessor or an Application Specific Integrated Circuit (ASIC), a storage unit 210 and a communication interfacing unit 220. The storage unit 210 may be any data storage device that can store a program code 214, accessed by the processor 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a radio transceiver and can exchange wireless signals with the network according to processing results of the processor 200.

Figure 3:
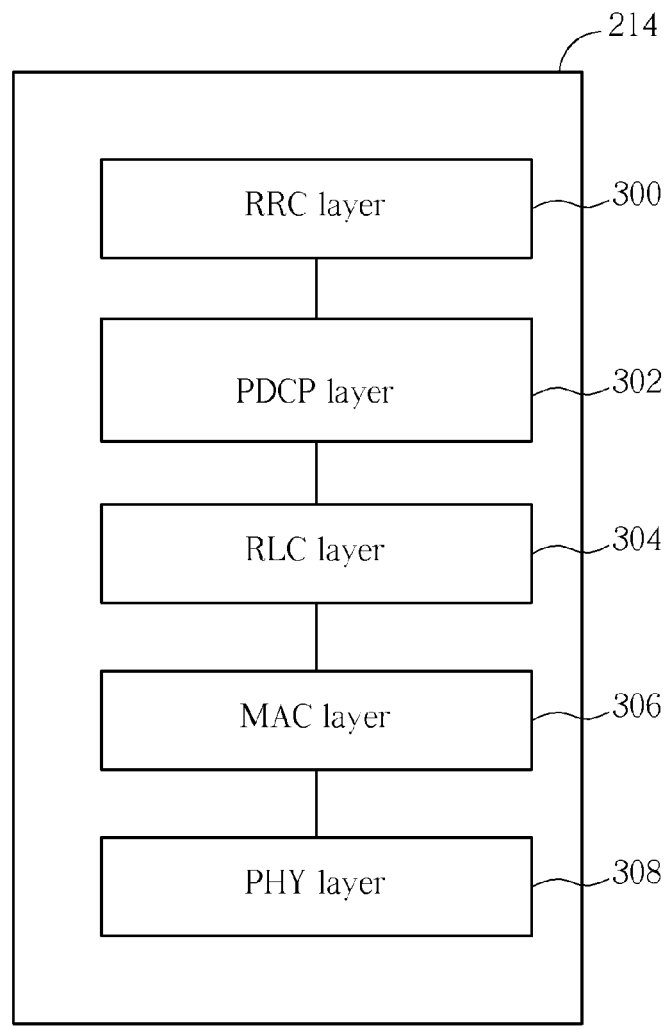
FIG. 3 is a schematic diagram of communication protocol layers for an exemplary wireless communication system.

Please refer to FIG. 3, which illustrates a schematic diagram of communication protocol layers for the wireless communication system 10. The behaviors of some of the protocol layers maybe defined in the program code 214 and executed by the processing means 200. The protocol layers from top to bottom are a radio resource control (RRC) layer 300, a packet data convergence protocol (PDCP) layer 302, a radio link control (RLC) layer 304, a medium access control (MAC) layer 306 and a physical (PHY) layer 308. The RRC layer 300 is used for performing broadcast, paging, RRC connection management, measurement reporting and control and radio bearer control responsible for generating or releasing radio bearers. The PDCP layer 302 is used for ciphering and integrity protection of transmissions, and maintaining delivery order during a handover. The RLC layer 304 is used for segmentation/concatenation of packets and maintaining delivery sequence when packet loses. The MAC layer 306 is responsible for a hybrid automatic repeat request (HARQ) process, multiplexing logical channels, a random access channel (RACH) procedure and maintaining a UL timing alignment. In each HARQ process, an acknowledgement (ACK) is reported to the network if the MAC data/control packet is received and decoded successfully. Otherwise, a negative acknowledgement (NACK) is reported to the network. The PHY layer 308 is used to provide physical channels. FIG. 3 simply illustrates the behaviors of the protocol layers conceptually, and the behaviors may be different for the LTE system and the UMTS system. For example, the PDCP layer 302 is not used for transmissions of RRC messages in the UMTS system. The PHY layer 308 in the UMTS system uses code division multiple access (CDMA) technology, but the LTE system uses orthogonal frequency-division multiple access (OFDMA)/orthogonal frequency-division multiplexing (OFDM) technologies.

Figure 4:
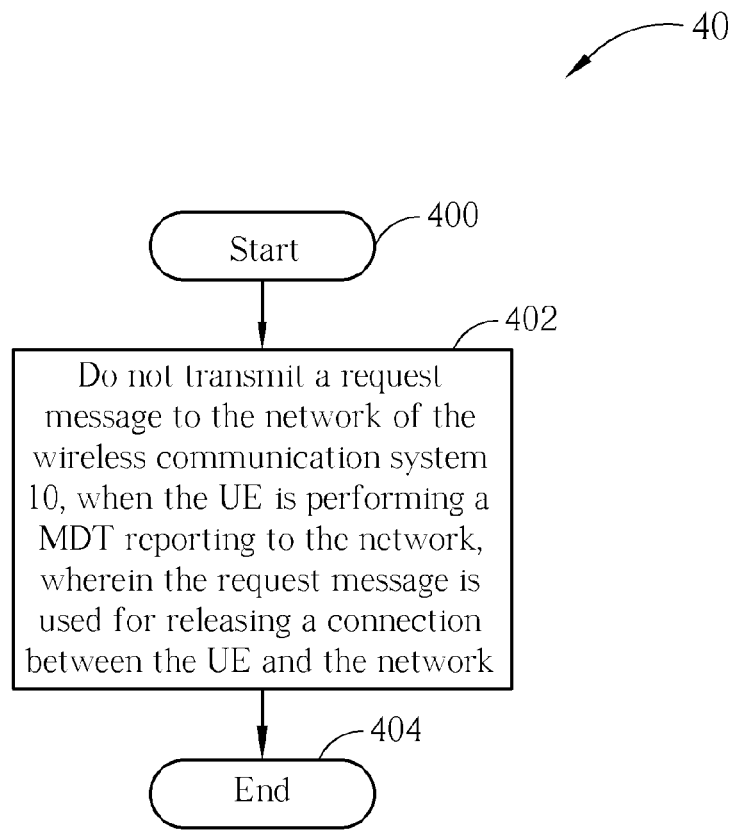
FIG. 4 is a flowchart of an exemplary process according to the present invention.

Please refer to FIG. 4, which is a flowchart of a process 40 according to an example of the present invention. The process 40 is utilized in a UE in the wireless communication system 10 shown in FIG. 1, to handle MDT reporting. The process 40 may be compiled into the program code 214 and includes the following steps:

Step 400: Start.

Step 402: Do not transmit a request message to the network of the wireless communication system 10, when the UE is performing a MDT reporting to the network, wherein the request message is used for releasing a connection between the UE and the network.

Step 404: End.

According to the process 40, when the UE intends to release the connection between the UE and the network by transmitting the request message to the network, the UE determines not to transmit the request message to the network if the UE is performing the MDT reporting. In other words, the UE saves transmission of the request message to keep the connection connected, and finishes performing the MDT reporting. Then, the UE transmits the request message to the network to release the connection. Preferably, the request message is a Signalling Connection Release Indication message defined in the 3rd Generation Partnership Project Technical Specification 25.331 (3GPP TS 25.331), and the MDT reporting is performed according to a logged MDT procedure defined in the 3GPP TS 37.320.

Therefore, according to the above illustration and the process 40, not only the MDT reporting can be performed and completed without being interrupted, but the UE can release the connection to reduce power consumption after performing the MDT reporting.

Figure 5:
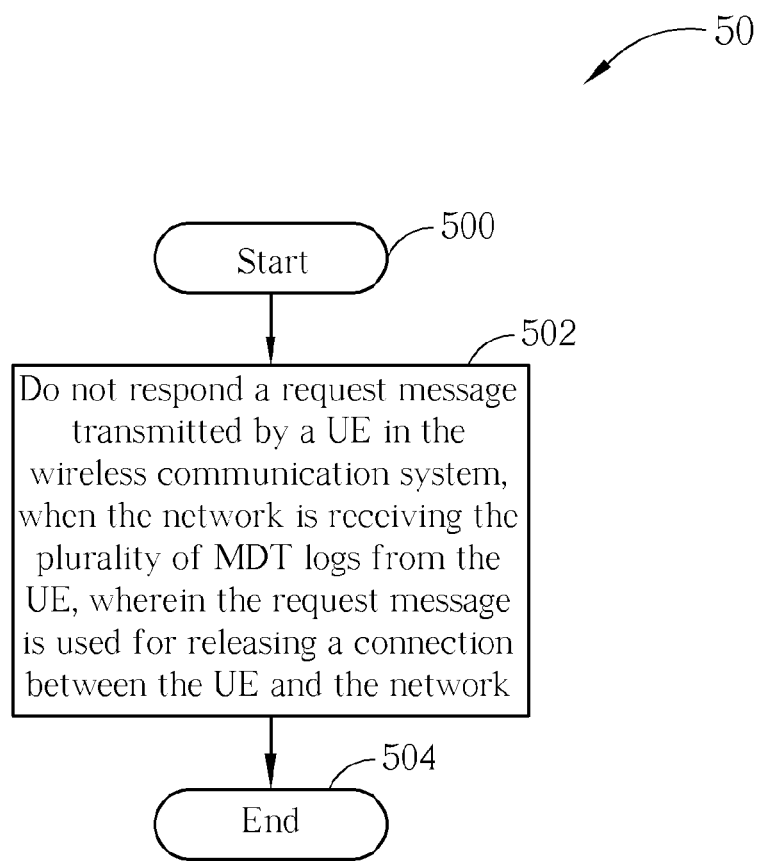
FIG. 5 is a flowchart of an exemplary process according to the present invention.

Please refer to FIG. 5, which is a flowchart of a process 50 according to an example of the present invention. The process 50 is utilized in the network of the wireless communication system 10 shown in FIG. 1, to handle a plurality of MDT logs. The process 50 may be compiled into the program code 214 and includes the following steps:

Step 500: Start.

Step 502: Do not respond a request message transmitted by a UE in the wireless communication system, when the network is receiving the plurality of MDT logs from the UE, wherein the request message is used for releasing a connection between the UE and the network.

Step 504: End.

According to the process 50, when the network receives the request message from the UE to release the connection, the network determines not to respond the request message to keep the connection connected if the network is receiving the plurality of MDT logs. In other words, the network stops responding the request message to keep the connection connected, and finishes receiving the plurality of MDT logs. Then, the network responds the request message to the UE to release the connection. Preferably, the request message is a Signalling Connection Release Indication message defined in the 3GPP TS 25.331, and the network receives the plurality of MDT logs according to a logged MDT procedure defined in the 3GPP TS 37.320.

Therefore, according to the above illustration and the process 50, the network can receive the plurality of MDT logs without being interrupted. Besides, the UE can release the connection to reduce power consumption, after the network finishes receiving the plurality of MDT logs and responds the request message.

Please note that, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

In conclusion, methods for avoiding interruption of the MDT reporting are presented. The interruption is caused by a request message transmitted by a UE to a network for releasing a connection between the UE and the network. According to either of the methods, the UE can release the connection to reduce power consumption after finishing the MDT reporting. Besides, the network can also finish receiving the plurality of MDT logs to obtain the plurality of MDT logs for optimizing deployment of the network.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling minimization of drive tests (MDT) reporting of a mobile device in a wireless communication system, the method comprising:

not transmitting a request message to a network of the wireless communication system, when the mobile device is performing the MDT reporting to the network and intends to release a connection between the mobile device and the network, wherein the request message is used for releasing the connection between the mobile device and the network; and transmitting the request message to the network, after finishing performing the MDT reporting.

2. The method of claim 1, wherein the request message is a Signalling Connection Release Indication message defined in the 3rd Generation Partnership Project Technical Specification 25.311 (3GPP TS 25.331).

3. The method of claim 1, wherein the mobile device performs the MDT reporting according to a logged MDT procedure defined in the 3GPP TS 37.320.

4. A method of handling a plurality of minimization of drive tests (MDT) logs of a network of a wireless communication system, the method comprising:

not responding a request message transmitted by a mobile device in the wireless communication system, when the network is receiving the plurality of MDT logs from the mobile device, wherein the request message is used for releasing a connection between the mobile device and the network; and responding the request message to the mobile device, after finishing receiving the plurality of MDT logs.

5. The method of claim 4, wherein the request message is a Signalling Connection Release Indication message defined in the 3rd Generation Partnership Project Technical Specification 25.311 (3GPP TS 25.331).

6. The method of claim 4, wherein the network receives the plurality of MDT logs according to a logged MDT procedure defined in the 3GPP TS 37.320.

* * * * *